No. 743,236. PATENTED NOV. 3, 1903.
H. BREMER.
ELECTRODE FOR ARC LAMPS.
APPLICATION FILED AUG. 5, 1899.
NO MODEL.
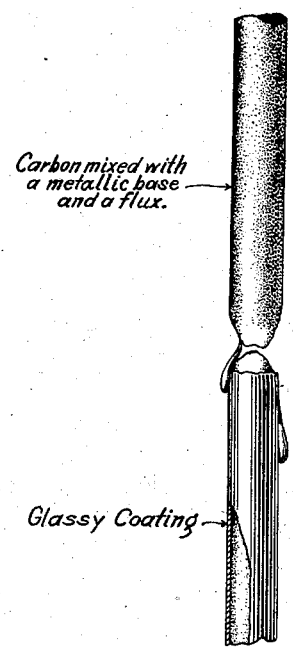
Witnesses:
Tho. H. Brown, Jr.
George H. Stockbridge
Inventor
Hugo Bremer
by Charles A. Terry, Att'y.

No. 743,236. Patented November 3, 1903.

UNITED STATES PATENT OFFICE.

HUGO BREMER, OF NEHEIM, GERMANY.

ELECTRODE FOR ARC-LAMPS.

SPECIFICATION forming part of Letters Patent No. 743,236, dated November 3, 1903.

Application filed August 5, 1899. Serial No. 726,343. (No model.)

*To all whom it may concern:*

Be it known that I, HUGO BREMER, a subject of the Emperor of Germany, residing at Neheim-on-the-Ruhr, Germany, have invented certain new and useful Improvements in Electrodes for Arc-Lamps, of which the following is a full and exact specification.

It is a well-known fact that the ordinary electric arc radiates only a small fraction of the quantity of light which is theoretically attainable, chiefly because carbon in the shape of vapor is no longer luminous. Many substances, however, especially those which have a high evaporating-point—such as the oxids of calcium, magnesium, and strontium, and other alkaline earths—possess the property of materially increasing the luminosity of the arc if they are introduced into the arc mechanically or in any other manner. These substances are well known and hereinafter shortly referred to as "luminiferous mineral matter." In most cases such substances will form deposits after having passed through the arc—that is to say, they will not remain gaseous at a temperature lower than that of the electric arc, but will condense and tend to form at the edge of the electrodes solid deposits or slag, which, gradually accumulating, form rings obstructing the emission of light and in some cases completely obscuring the arc. This evil grew in direct ratio with the percentage of the luminiferous metallic base mixed with the carbon and rendered a high percentage impracticable. Moreover, it was not generally known that the salts to be mixed with the carbon should be calcined in order to avoid porosity of the electrode. I have found that the slag can be rendered harmless by adding to the carbon a suitable quantity of a flux, such as boric acid, silica, (silicic acid,) or an alkaline borate of silicate or sodium chlorid, these substances having the property of fusing at the temperature of the arc and then absorbing the basic slag by forming a borate or silicate of a luminiferous metallic base, which falls off in drops or small particles. Instead of adding a metallic base and a flux to the carbon separately they may be chemically combined before they are mixed with the carbon. In other words, I may use a borate or a silicate of a luminiferous metallic base.

As the nature of a flux is well known, for instance, in ceramic arts and in the working of blast-furnaces and depends, of course, on the particular material which it is intended to liquefy or absorb, it will not be necessary or practicable to specify every substance that may be used as a flux in the manufacture of carbons containing luminiferous mineral matter. In other words, as soon as the composition of the luminiferous mineral matter in the carbon is known a chemist acquainted with ceramic or glass industry will also know what materials may be used as a flux for that particular kind of carbon.

The quantity of luminiferous mineral matter to be mixed with the carbon may be from ten to fifty per cent. of the mixture of materials from which the carbon electrodes are made, preferably from twenty-five to thirty per cent. The quantity of the flux depends partly on the nature and quantity of the luminiferous base and partly on the nature of the flux. The total quantity of mineral matter contained in the carbon—that is to say, the luminiferous salts and the flux—should be at least twenty per cent. and not more than eighty per cent. of the carbon mixture, or from one-fourth to four times the quantity of carbon used. A higher percentage would be too detrimental to the strength of the electrode and to the temperature of the arc. On the other hand, if the quantity of luminiferous mineral matter is much smaller than those specified above, as has been the case in the earlier attempts, the least inequality of distribution causes considerable fluctuation of the arc, because the particles of mineral matter are placed far apart and cause a sudden flicker when the arc reaches the same. For this reason and others such carbons have not come into extensive use, although many attempts have been made by other inventors.

I am aware that it has been proposed to mix with the carbon a small percentage of luminiferous mineral matter and also substances which in certain combinations may act as a flux, but not such a large percentage as specified above and for different purposes, not with the knowledge that the combination of the two kinds of metallic salts offers the advantage that one acts as a flux on the other. Where the percentage has been mentioned at all, it is much lower than the limits specified above and not high enough to render the light decidedly better than the ordinary arc-light.

If the slag produced by the burning of the upper carbon forms a viscous liquid which falls off in drops and if the lower carbon is uncoated, the drops which fall upon the edge of the lower carbon will adhere to the same, and the consecutive drops will gradually form on the edge of the lower carbon a ring which interferes with the burning of the carbon, as well as with the emission of light. If, however, the lower electrode has a glassy coating of borax, a silicate, or other suitable material, the drops of slag from the upper electrode will congeal immediately after they have separated and will slide down along the lower carbon without producing any injurious effect. The lower carbon should therefore be provided with a glassy coating.

The accompanying drawing shows parts of two electrodes arranged one above the other, the lower electrode having a glassy coating, as described herein. Suitable legends on the drawing indicate the composition of the electrodes and the character of the coating.

What I claim is—

1. An electrode for arc-lamps containing above ten per cent. of luminiferous mineral matter intimately mixed with carbon, and also containing a mineral adapted to act as a flux for the slag produced by the consumption of the said luminiferous matter.

2. In an arc-lamp, a pair of electrodes arranged one above the other, the upper electrode being of carbon intimately mixed with above ten per cent. of mineral matter which, on being consumed, forms a liquid slag, and the lower electrode being provided with a glassy coating.

In witness whereof I have hereunto set my hand in the presence of two subscribing witnesses.

HUGO BREMER.

Witnesses:
HENRY HASPER,
WOLDEMAR HAUPT.